(12) United States Patent
Rosenblatt et al.

(10) Patent No.: US 11,787,624 B2
(45) Date of Patent: *Oct. 17, 2023

(54) STACKABLE CAST STONE COMPOSITE FERMENTATION AND STORAGE TANK

(71) Applicant: Rosenblatt Innovations LLC, Petaluma, CA (US)

(72) Inventors: Stephen Rosenblatt, Glen Ellen, CA (US); Carl Finney, Glen Ellen, CA (US); David I Jensen, Glen Ellen, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/660,547

(22) Filed: Apr. 25, 2022

(65) Prior Publication Data

US 2022/0242659 A1    Aug. 4, 2022

Related U.S. Application Data

(63) Continuation of application No. 16/465,986, filed as application No. PCT/US2017/064321 on Dec. 1, 2017, now Pat. No. 11,332,305.

(60) Provisional application No. 62/429,015, filed on Dec. 1, 2016.

(51) Int. Cl.
| | |
|---|---|
| *B65D 88/02* | (2006.01) |
| *B65D 90/02* | (2019.01) |
| *B65D 90/58* | (2006.01) |
| *C12G 1/00* | (2019.01) |

(52) U.S. Cl.
CPC ......... *B65D 88/022* (2013.01); *B65D 90/022* (2013.01); *B65D 90/585* (2013.01); *C12G 1/00* (2013.01)

(58) Field of Classification Search
CPC .... B65D 88/022; B65D 88/02; B65D 90/022; B65D 2590/02; B65D 90/44; B65D 90/041; C12G 1/00

See application file for complete search history.

(56) References Cited

U.S. PATENT DOCUMENTS

| | | | | |
|---|---|---|---|---|
| 6,006,944 A | * | 12/1999 | Machledt ............ | H01M 10/658 220/567.1 |
| 11,332,305 B2 | * | 5/2022 | Rosenblatt ............... | C12H 1/22 |
| 2006/0219649 A1 | * | 10/2006 | Wolfford ............... | B66C 23/208 220/212.5 |
| 2009/0255927 A1 | * | 10/2009 | Flecknoe-Brown ..... | C12H 1/22 426/11 |

(Continued)

*Primary Examiner* — Stephen J Castellano

(57) ABSTRACT

A liquid storage vessel having a base with a bottom and an interior floor; a continuous side extending vertically from the base and having an interior surface, the bottom and continuous side each including an internal layer and an external layer separated by a material barrier and configured such that the interior layers form an inner containment liner, and the external layers form a continuous exterior structural shell enclosing the inner containment liner. A top is affixed to the continuous side and has an interior ceiling. Access to the tank interior is provided by one or more manways. Mounting and connecting structures enable the tanks to be stacked directly atop one another and then structurally connected. The exterior structural shell is fabricated from high performance fiber reinforced concrete, and the inner containment liner is fabricated from a geopolymer concrete blend.

10 Claims, 11 Drawing Sheets

(56) References Cited

U.S. PATENT DOCUMENTS

2012/0020742 A1* 1/2012 Mahmoud .............. B65D 88/78
405/224
2017/0275093 A1* 9/2017 Oltman .................. B65D 90/10

* cited by examiner

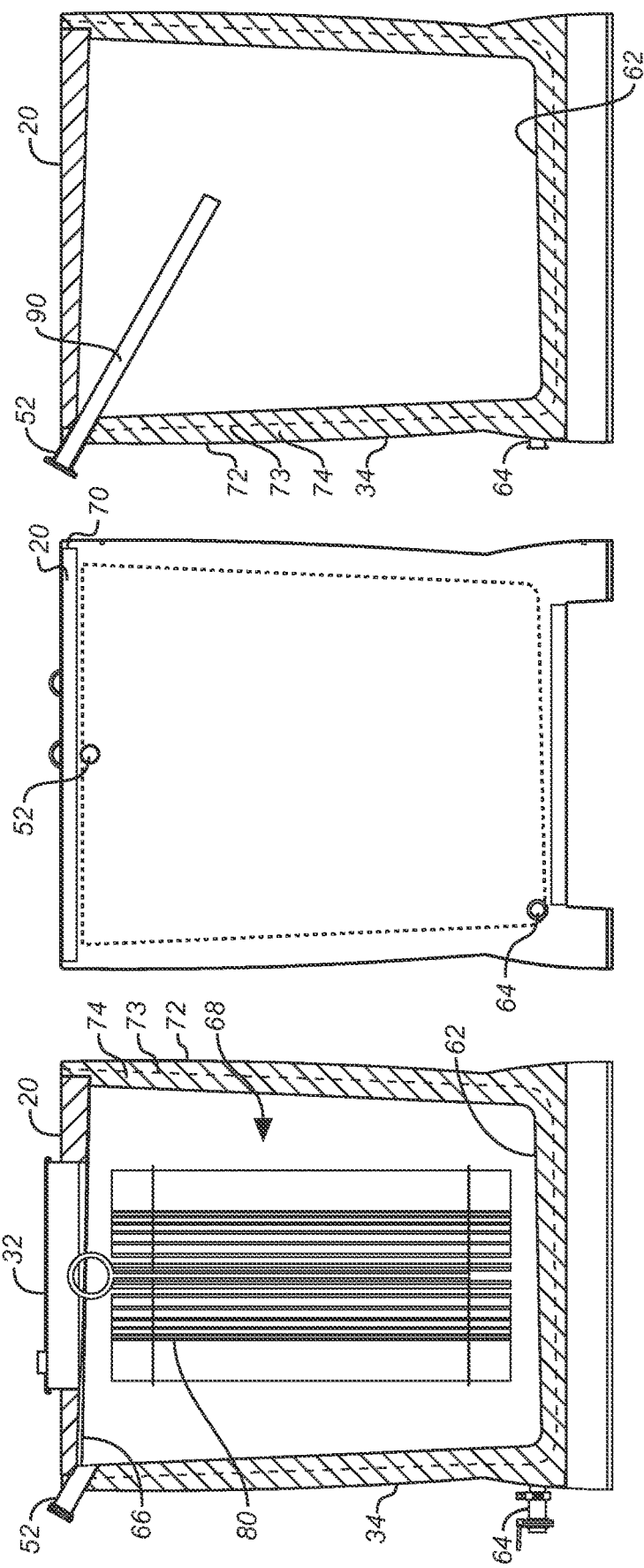

| Compression Strength in psi (Average of 4 Specimens per Data Point) | | | | | |
|---|---|---|---|---|---|
| Test material | day 1 | day 3 | day 7 | day 14 | day 28 |
| PC control | 2450 | 4731 | 5237 | 5762 | 6462 |
| Fly ash geopolymer control | 7987 | 8550 | 8793 | 9125 | 9057 |
| Geopolymer blend #1 | 3981 | 4781 | 6112 | 6975 | 7574 |
| Geopolymer blend #2 | 7050 | 8593 | 8956 | 9262 | 9339 |

*FIG. 12A*

| pH Elevation in Tartaric Acid Wine Solution from Sustained Exposure to Test Specimens; (Solution pH 4.1 Prior to Test Exposure) | | | | | |
|---|---|---|---|---|---|
| Test material | day 1 | day 3 | day 7 | day 14 | day 28 |
| PC control | 4.3 | | 4.7 | 4.9 | 4.9 |
| Fly ash geopolymer | 4.2 | | 4.6 | 4.6 | 4.6 |
| Geopolymer blend #1 | 4.2 | | 4.5 | 4.5 | 4.5 |
| Geopolymer blend #2 | 4.2 | | 4.5 | 4.5 | 4.5 |

*FIG. 12B* pH Elevation in Tartaric Acid Wine Solution from Sustained Exposure to Test Specimens; (Solution pH 3.3 Prior to Test Exposure)

| Test material | day 1 | day 7 | day 14 | day 28 |
|---|---|---|---|---|
| PC control | 3.4 | 3.7 | 3.9 | 4.1 |
| Fly ash geopolymer control | 3.3 | 3.4 | 3.4 | 3.5 |
| Geopolymer blend #1 | 3.3 | 3.4 | 3.4 | 3.5 |
| Geopolymer blend #2 | 3.3 | 3.4 | 3.4 | 3.4 |

FIG. 12C

Average Mass Loss Measurements of Test Specimens from Table 12B) and 12C) Exposure Tests

| Test material | pre-test weight | days exposed | post-test weight | loss |
|---|---|---|---|---|
| PC control | 270.4 | 7 | 263.8 | 6.6 |
| Fly ash geopolymer control | 273.1 | 7 | 269.3 | 3.8 |
| Geopolymer blend #1 | 252.8 | 7 | 248.9 | 3.9 |
| Geopolymer blend #2 | 257.8 | 7 | 255.1 | 2.7 |

FIG. 12D

Heavy Metal Content ppm
PC and Fly Ash Data are Expressed in an Average Range of 3 Different Studies

| Heavy Metal | | PC | Fly Ash | Formula#1 | Formula#2 |
|---|---|---|---|---|---|
| As | Arsenic | 6.5-20 | 20-400 | 0-5 | 10-140 |
| Cd | Cadmium | 0.6-3 | 0.7-10 | 0-2 | 0-5 |
| Co | Cobalt | 8.5-21 | 19-200 | 0-9.5 | 5.5-75 |
| Cr | Chromium | 48-89 | 40-500 | 0-30 | 13-185 |
| Cu | Copper | 28-47 | 25-85 | 6.5-28 | 8.5-28 |
| Mn | Manganese | 300-900 | 400-1100 | 180-500 | 330-850 |
| Ni | Nickel | 34-56 | 49-495 | 4.5-30 | 20-195 |
| Pb | Lead | 21-47 | 41-200 | 7.5-35 | 19-101 |
| Sb | Antimony | 3.9-9 | 6.5-20 | 0-6.5 | 0-7 |
| Sn | Tin | 0.7-6 | 2.5-16 | 0-5 | 0-9.3 |
| Ti | Titanium | 0.6-6.5 | 0.75-80 | 0.2 | 0-26 |
| Zn | Zinc | 130-200 | 82-900 | 35-90 | 57-300 |

*FIG. 13*

STACKABLE CAST STONE COMPOSITE FERMENTATION AND STORAGE TANK

CROSS REFERENCE TO RELATED APPLICATIONS

The present application is a continuation of U.S. patent application Ser. No. 16/465,986, allowed, now U.S. Pat. No. 11,332,305, which was the U.S. National Stage (371) application filed under 35 U.S.C. § 371 based on International Appl. No. PCT/US17/64321, filed 1 Dec. 2017, which was based on U.S. Provisional Patent Appl. Ser. No. 62/429,015, filed 1 Dec. 2016.

BACKGROUND OF THE INVENTION

Technical Field

The present invention relates to food and beverage storage containers, and more particularly to wine and beer storage tanks, and even more particularly to a concrete storage tank having a two-layered composite wall structure with an interior layer fabricated with a material formulation that enhances the performance of the vessel as a food and beverage storage tank but does not impart undesirable flavors into the stored liquid nor in any other way adversely affect the food or beverage product, and an exterior layer fabricated with a fiber reinforced cementitious material designed for structural stability and for effectively containing internal atmospheres.

Background Art

The use of concrete and fired clay ceramic containers for water storage, wine fermentation, and wine storage, is well known in the art. The ancient Georgians were the first to use clay vessels for wine in circa 6000 BCE. Egyptians are known to have used fired clay amphoras as early as 2000 BCE. Ancient Rome used the clay amphora and wooden vats for wine fermentation, and the first wooden barrel for wine transportation in 50 CE, and later in the first century CE the Romans were the first to use concretes that contained a hydraulic and pozzolanic type cement for wine fermentation and storage.

Concrete quickly became and remained the first choice for large volume wine fermentation and storage because of the ready availability of its raw materials and because of its property of having a large thermal mass. That large thermal mass maintains a consistent storage temperature for wine.

By contrast wood barrels were primarily used for transportation. However, they were also used for fermentation and storage where suitable wood was plentiful. Stainless steel tanks were not used in wine production until the 1960's, but thereafter they quickly became the dominant material in commercial wine production globally because of their durability and lower maintenance requirements.

Ceramics, and more particularly kiln fired clay ceramics, are by nature more chemically inert than Portland cement mortar and/or concrete as well as non-kiln fired clays. But kiln fired ceramics require extremely high temperatures and therefore result in extremely high costs for large units. Such a process is entirely incompatible with the composite structure of the present invention.

Low temperature geopolymer formulations, also known as raw ceramics and/or alkali activated binders, are well-known in the art. These formulations generally comprise dry earth components including aluminum silicate materials, most often derived from industrial waste fly ash materials. Less frequently they are formulated using natural pozzolanic clay, and still less frequently using calcium carbonate materials. The dry earth components are typically combined with a high alkaline solution consisting of sodium silicate and sodium and/or potassium hydroxide as an activator to form a ceramic polymer that does not require the high temperatures employed in the kiln firing of ceramics. Raw ceramic geopolymers are usually combined with aggregates to make mortars and concretes.

High performance geopolymers—that is, more chemically inert geopolymers and fired clay ceramics in general—are known for their higher chemical inertness and their durability, holding up extremely well to environmental conditions that typically cause material degradation. Low temperature, high performance geopolymer mortar and concretes are typically more acid resistant than Portland cement mortars and concretes. However, low temperature; high performance geopolymers typically have a high fly ash content, which is considered a toxic waste material. This is due to the fact that they typically have a high heavy metal content.

Geopolymers comprising dry earth materials other than fly ash and general kiln ashes—materials such as uncalcined, aluminosilicate clays—are not considered "high performance" geopolymers in the industry because they have a higher water demand and a higher organic content, which results in lower compression strength, more chemical reactivity, and less acid resistance. Therefore, most geopolymer development has been concentrated in the use of industrial waste fly ashes. The consequence is that the most common application for geopolymers has been as a substitute for Portland cement in the fields of toxic waste containment and concrete waste pipe manufacturing. Accordingly, those skilled in the art would not consider using a geopolymer chemistry for a wine or food storage container.

Background Discussion Regarding Wine Industry Applications: Currently, the pH of premium wines ranges between pH 3 and pH 4. Wines with a lower pH tend to taste fresher, more tart, and they age longer with less likelihood of spoilage. Wines with a higher pH tend to taste flat and oxidize at a higher rate, and they are more susceptible to microbial spoilage.

The dissolved oxygen content of premium wines ranges between 5 to 8 ppm. Levels above 8 ppm of dissolved oxygen in wine are considered excess oxidation or oxygen saturation and can elevate pH levels and result in spoilage. Dissolved oxygen amounts lower than 5 ppm results in a sub-premium wine.

Conversely, in wine fermentation, available oxygen is important and beneficial to initiate and maintain the fermentation process. Oxygen demands and benefits decrease as the fermentation cycle matures, yet as the fermentation cycle continues, temperature control becomes essential to sustain and complete proper fermentation.

The wine industry has come to recognize the benefits that early cast stone vessels provided in wine making history. Not only did the porosity of the cast stone vessels give them a greater surface area, they had a considerable thermal mass, and thus more temperature stability. The ancient practice of using stone vessels, long ignored and largely forgotten, has been resurrected. There is now a developing trend in premium wine production to return to the use of cast stone and ceramic vessels, again owing to the influence of surface porosity and thermal mass. However, this new trend is limited substantially to the fermentation process.

Portland cement is a hydraulic binding cement classified by the ASTM into six different types: Types I-V, and ordinary white Portland cement. All types are variations on the tricalcium silicate chemistry of Portland cement. Type I is considered general purpose; type II has a moderate sulfate resistance; type III has high early strength; type IV is a slow reacting; type V has high sulfate resistance; and white cement is considered decorative and similar to type I. Types I and II Portland cements are the most commonly used and type II is often blended with type V. Therefore, types I and II by themselves, and the blend of type II and V will be referred to hereafter as "Standard Portland cement."

Fermentation tanks made of Standard Portland cement concretes have an alkalinity of 10 to 11 pH, and the high surface area contact of the porous concrete surface reacts with the acidic wine (pH of 3 to 4) to create a vigorous ionic exchange between the concrete and the wine. This provides available oxygen for the early part of the fermentation process. The oxygen production falls off as tartrates accumulate on the concrete surface, forming a quenching barrier between the pH differentials. The proliferation of yeast cycling to sugar and then to alcohol in the fermentation process consumes the surplus oxygen from the initial pH reaction, rendering a stable oxygen and pH level. Thus, the dissimilar chemistries between the wine and the standard Portland cement concretes lend themselves beneficially to the fermentation process. Furthermore, the thermal mass of a concrete tank benefits the control of temperature for optimal results. The benefits mentioned above are not realized in the stainless steel and/or plastic fermentation tanks commonly used in the industry today.

However, the benefits deriving from the dissimilar chemistries in premium wine production using standard Portland cement concretes are not without a considerable cost, inasmuch as they result in the slow but steady decomposition of the concrete; so the useful life of Standard Portland cement vessels are limited. Regardless of the noted benefits of Portland cement concrete in fermentation, and even knowing the long history of hydraulic/pozzolanic cement concrete use in wine storage, because current day standard Portland cements react with acidic wines, and decompose as a result, standard Portland cement concrete is not the best choice for long term wine storage involving sustained exposure to wine.

Wine storage and pre-bottle aging is the last step in the wine making process, coming after the blending and fermenting of the grape juice to make the wine, and before bottling. In today's wine industry there is an increasing concern over the control of dissolved oxygen and pH levels in the pre-bottle storage and aging steps. This is because higher levels of oxygen exposure are nearly unavoidable in the bottling process, and any addition of oxygen to the liquid will only contribute to the total dissolved oxygen content of the bottled wine and thus the potential spoilage of the wine. This is the principal reason that long term wine storage in tanks made from Portland cement concrete has been limited to extremely large volumes of sub-premium wines in extremely large tanks, wherein the ratio of the surface area of the tank to the volume of the wine is smaller and therefore has less of an adverse impact. Furthermore, there is a trend in the United States Food and Drug Administration to more closely monitor the production of wine and to mandate more sanitary conditions for wine storage. Accordingly, those skilled in the art have not considered using low volume cast stone wine storage containers, whether made of Portland cement or geopolymeric concrete.

Disclosure of Invention

The present invention is a stackable, long-term food and beverage storage vessel especially well-suited for wine storage. The vessel includes a two-layered composite wall structure having an interior layer with interior surfaces fabricated with a composition advantageous for food and beverage storage by not imparting undesirable flavors into the stored liquid, and with an exterior layer fabricated with a fiber-reinforced concrete material that greatly enhances the structural stability of the vessel to effectively contain internal atmospheres. These benefits are highly desirable in wine storage and aging but apply equally well for the production and storage of many other beverages and foods.

The inventive vessel further provides a stackable storage unit with a higher thermal mass than the oak barrels and stainless steel tanks currently employed in the food and beverage (wine) industries. The higher thermal mass is better for maintaining consistent temperatures of the stored product. Due to its material formulations, it also provides a porous interior stone surface area that does not react adversely with acidic wines, either by corroding or undergoing other reactions that cause material decomposition. The vessel thereby provides a long lasting, low maintenance surface that does not contribute to an undesirable elevation of wine pH and dissolved oxygen levels in a vessel that optimizes thermal stability.

In a preferred embodiment of the present invention the interior side of the composite tank is composed of a geopolymer concrete. The geopolymer concrete includes dry earth components, silica sand, and water. The dry earth components of the geopolymer include a unique blend of natural clay, carbonates and pozzolans, and industrial waste materials chosen for their distinct strength development characteristics, minimal organic content, minimal loss on ignition (LOI) and minimal heavy metal content. The alkaline reactive components include sodium silicate, sodium hydroxide potassium hydroxide, colloidal silica, and solutions of inorganic alkaline salts, The geopolymeric binder further includes specific amounts of hydrophilic crystals, and tartaric acid salts.

In another embodiment the interior side of the composite tank is composed of concrete comprising specific blends of cements, SCM's (supplementary cementitious materials) and performance supplements in specific ratios. The cements in the blend are chosen from a group of hydraulic, pozzolanic and refractory cements, including specific Portland cement types, calcium aluminate, aluminum phosphate, and magnesium phosphate cements, and the SCM's are chosen from a group including; blast furnace slags, ultra-fine fly ash, natural pozzolans of specific particle sizes and ground fired clay bisque. The performance supplements include hydrophilic crystals, colloidal micro silica, and solutions of inorganic alkaline salts. All components are chosen either for a low heavy metal content and/or a chemical contribution for acid resistance.

In embodiments the interior sides of the vessels are more chemically inert than Standard Portland cement concrete and possess a substantially non-reactive stability when directly exposed for sustained periods of time to extreme chemistries or pH disparities, such as those found in the storage of wine.

Further, in an embodiment the present invention also relates to a storage vessel structure that includes a combination of two different material layers comprising the tank envelope. The layers optimize structural and functional performance as a wine storage vessel. The layered structure consists of a novel blended cement or geopolymer concrete formula on the interior of the tank envelope and a GFRC (glass fiber reinforced concrete) structural shell on the exterior of the tank envelope. The composite nature of the vessel envelope, having a high density concrete on the interior and the high flexural strength of a glass fiber reinforced concrete on the exterior, eliminates structural faults on the interior portions of the composite envelope from telegraphing to the exterior to more effectively contain internal atmospheres and substantially eliminate the potentials for leaks. The internal conditions of the composite benefit the development and storage of fermented beverages, including beer and wine, as well as food products.

In addition, the inventive vessel design substantially eliminates atmospheric head space that may include air pockets above the stored product, thereby minimizing product spoilage due to oxygen exposure.

The vessel design facilitates unit-on-unit (tank-on-tank) stacking as well as transport by forklift. At the same time, the vessel design provides structures to facilitate access to stored product for testing, sampling, and the insertion of flavor submersibles and environmental control devices, all of which are incorporated into the design so that they are accessible after units have been stacked.

It is an object of the present invention to provide a long-term wine storage vessel for storing wine in a cast stone material having substantially lower heavy metal content than typically found in known cast stone materials. Embodiments of the present invention have a lower heavy metal content than that found in Standard Portland cement concretes, and a lower heavy metal content than is typical in low temperature, high-performance geopolymer concrete.

It is a further object of the present invention to provide a long-term wine storage vessel wherein the material formulations and the composite design provide optimal control of the temperature, oxygen content and pH levels of the stored food and beverage product.

It is yet another object of the present invention to provide a long-term, stackable wine storage vessel wherein the wine (stored product) is contained in a cast stone composite container that does not leak and costs less per volume than oak barrels and fired clay ceramic vessels.

Embodiments of the present invention include several novel features, among which are the following:

(1) Geopolymer formula: A geopolymer formula with low heavy metal content for use in a food grade storage vessel. The geopolymer formula cast in mortar cubes achieves three day compression strengths between 3000 and 9000 psi, seven day strengths between 4000 and 10,000 psi, and 14 day strengths between 5000 and 11,000 psi.

Geopolymer blend (formula) #1 (geopolymer blend #1) below has 20% to 60% less heavy metal content than published Portland cement averages.

Geopolymer blends (formulas) #1 and #2 below have 50% to 80% less heavy metal content than typical fly ash averages. [See the table of FIG. 13, 240]

Mortar cubes made from the embodiment of formula #1 have been shown to lose 40% less mass than standard Portland cement mortar cubes in sustained exposures to tartaric acid wine solution with a pH range of 3.3 to 4.1, as expressed in the table of FIG. 12D.

Mortar cubes made from the embodiment of formula #2 have been shown to lose 59% less mass than standard Portland cement mortar cubes in sustained exposures to tartaric acid wine solution with a pH range of 3.3 to 4.1, again expressed in the table of FIG. 12D. The controls and the inventive geopolymer blend cubes were all cast as 2"×2"×2" cubes and cured at 120 to 160 degrees F. for 24 hours. They were then tested and analyzed at 14 days.

In the sustained exposure testing expressed in the tables of FIGS. 12C-12D; formulas #1 and #2 elevated the pH of the tartaric acid wine solution 0.4 to 0.7 pH less than the standard Portland cement cubes and 0.1 pH less than the fly ash base geopolymer control cubes.

(2) A specific blend of hydraulic, pozzolanic and refractory cements, binding activators, and SCM's formulated for low acid reactivity, low permeability and low heavy metal content.

(3) Composite wall design: The walls of the storage vessel are a binary composite comprising a structural outer layer and a generally chemically inert inner containment layer. The outer layer is a high performance GFRC (glass fiber reinforced concrete) that provides an exterior structural shell of high flexural, tensile, and compression strengths. The high strength is due, in part, to integral additives well known to the art. The structural exterior shell has no contact with the stored product (wine or food). It may be pigmented and sealed with penetrating and/or topical sealers and finishes such that the GFRC exterior doubles as a decorative outer shell.

The binary envelope of the composite design also includes an interior containment liner of a particular cast stone concrete which provides a substantially chemically inert surface area engineered for direct contact with the wine (stored food product). The benefits of this composite design and the synergy of its binary parts collectively provide a storage vessel that is highly resistant to cracking and leaking. Furthermore, the design substantially increases the containment of atmospheres and therefore significantly enhances the ability to control oxygen levels, which is critically important to wine storage and aging.

(4) General Design: The inventive storage vessel is designed to achieve several novel features, including:

(a) elimination of head space: One of the primary achievements of the general design was to eliminate dimensional head space above the beer, wine, or stored food product.

(b) stackability: Another objective of the general design was to facilitate both forklift mobility and unit stacking.

(c) Access and Control of Stored Product: Another object of the general design was to facilitate access to the stored product, even when units are stacked. Access ports for filling, sampling, pumping-over and racking remain accessible after units are stacked. Access ports also accommodate technical monitoring devices, including level sensors for topping off head space and monitoring product loss, an oxygen sensor, a pH monitor and temperature sensor and sleeves for flavor submersibles.

(5) The fifth novel characteristic resides in the formula for making the vessel structure, as set out in the detailed description that follows.

(6) Lower cost alternative: Another primary goal of the present invention is to provide a low volume storage vessel that provides the benefits of high thermal mass in a stackable unitary design that will last significantly longer than oak barrels and thus to provide a lower cost alternative for stackable wine storage.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a cross-sectional side view in elevation, showing a plurality of flavor imparting oak staves suspended from the top manway;

FIG. 6 is a rear view in elevation of the vessel of FIG. 1A;

FIG. 7 is a cross-sectional side view in elevation thereof;

FIG. 12A is a table comparing the compression strength of two novel geopolymer blends employed in embodiments of the storage vessel of the present invention with the compression strength of a Portland cement control and a fly ash geopolymer control;

FIG. 12B is a table comparing pH elevations in wines stored long term in vessels having interior walls composed of the geopolymer blends of the present invention against the above-identified controls;

FIG. 12C is a table showing pH elevations in tartaric acid wine solutions at a beginning pH of 3.3 and comparing the elevations in solutions stored in the vessels of the present invention as against the above-identified controls;

FIG. 12D is a table showing mass loss for mortar cubes made from the geopolymer formulas used in the present invention as against mass loss in identically sized mortar cubes made from standard Portland cement and a control fly ash geopolymer after sustained exposures to tartaric acid wine solution with a pH range of 3.3 to 4.1; and FIG. 13 is a table showing the heavy metal content of the geopolymer blends of the present invention as compared to the heavy metal content of standard Portland cement and a fly ash geopolymer.

BEST MODE FOR CARRYING OUT THE INVENTION

Figure 1A:
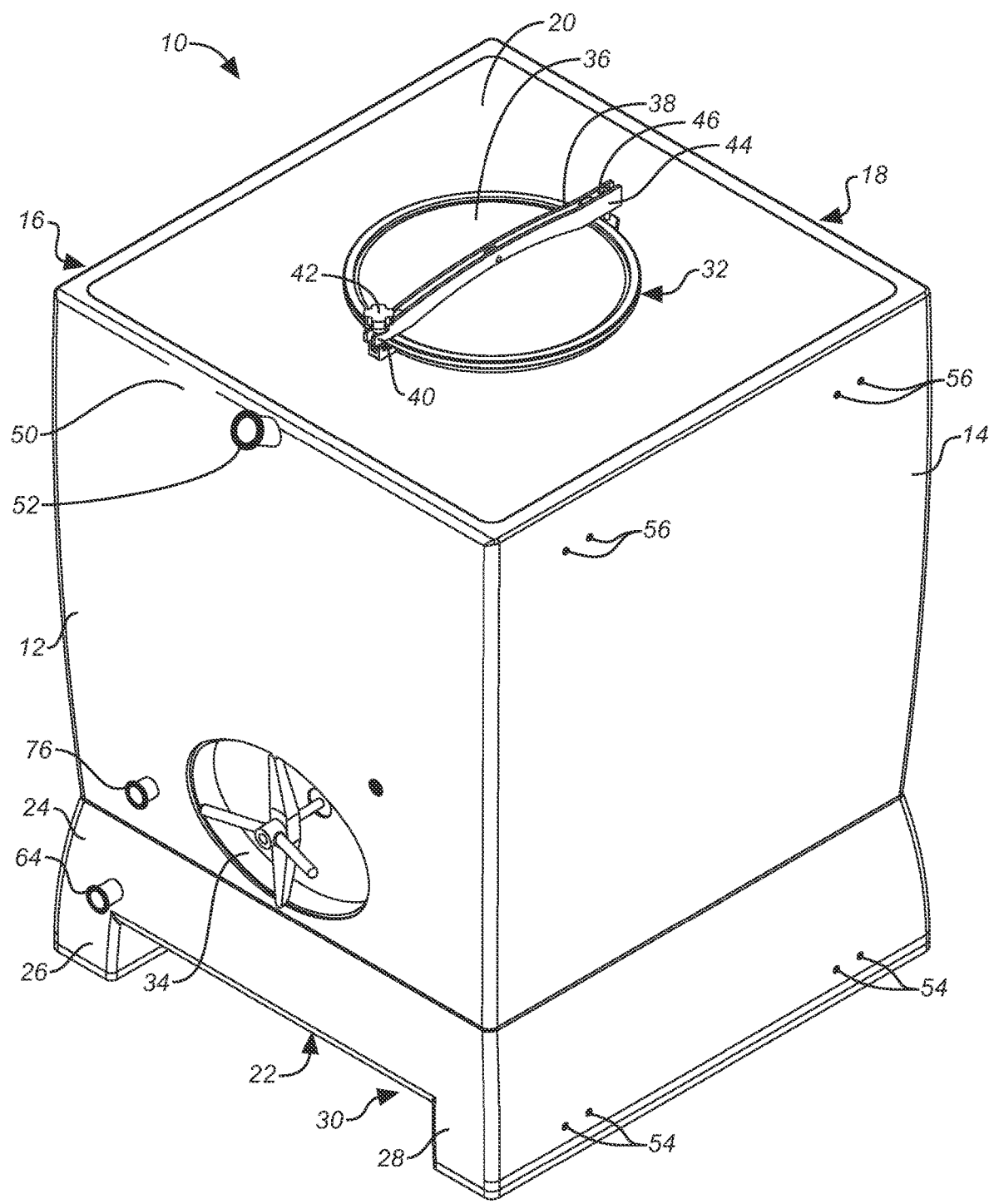
FIG. 1A is an upper right front perspective view of an embodiment of the stackable geopolymer-based fermentation and storage vessel of the present invention.

Referring first to FIGS. 1 through 11, wherein like reference numerals refer to like components in the various views, there is illustrated therein a new and improved stackable geopolymer-based fermentation and storage tank, generally denominated 10 herein.

FIGS. 1-4, 6-9 illustrate an embodiment of the stackable cast stone fermentation and storage vessel as described herein. Collectively, these views show that in an embodiment the vessel may be generally cuboid in shape, perhaps having a height dimension slightly exceeding its width and depth dimensions. For both structural and ornamental purposes, the sides may include a slight outward medial (belly) bulge, thereby providing an elegant departure from a tedious and exclusively utilitarian straight-line geometry.

In an embodiment, the vessel includes a front side 12, a right side 14, a left side 16, a rear side 18, a top 20, a bottom 22, all forming contiguous and continuous walls, both interiorly and exteriorly. A base 24, of which the bottom 22 is an integral part, is disposed under the vessel bottom and has spaced apart pairs of right and left legs 26, 28, respectively, defining a space 30 under the vessel to accommodate the forks of a forklift. For added structural integrity, the legs may be reinforced with deformed welded wire mesh (not shown, but known in the art).

Figure 1B:
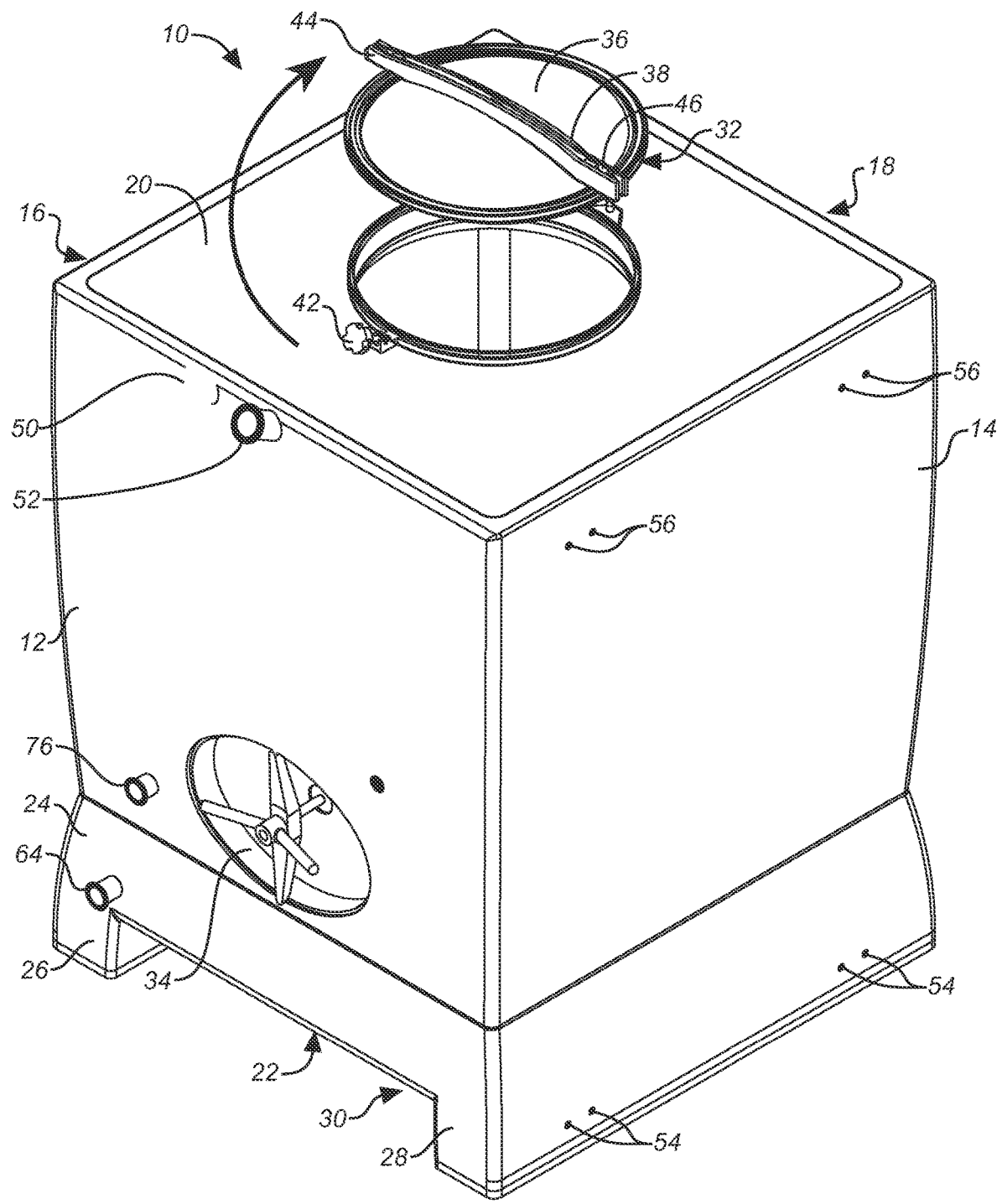
FIG. 1B is the same view showing a top side manway partially opened.

The vessel further includes a top manway 32 and a sidewall manway, preferably a front side manway 34, providing access to the vessel interior. The top manway 32 includes a stainless steel circular manway cover 36 coupled to a bracket (or swing arm) 38 to provide a hygienic closure when clamped tightly in a closed position. The closure includes an open-toe clamping assembly 40 which has a swing bolt assembly 42 at the outboard end of the bracket so that the swing bolt can be pivoted out of the open toe of the bracket 38. The opposite end 46 of the bracket 38 is pivotally coupled to the vessel top on a pivot pin 46 so that when the swing bolt is loosed and removed from the bracket, the manway cover can be slightly lifted and then opened by swinging (pivoting) the cover away from the manway opening. In this way, the manway cover is pivotally attached to the top in such a way as to pivot on a horizontal plane onto and away from the manway hole. Thus, access to the vessel can be achieved even when there is little clearance above the vessel, such as when it the lower vessel in a stacked configuration (see, esp. FIG. 1B).

Small cylindrical access ports 50, 52, may be provided at the front of the vessel for installing product sensors, introducing a sample extractor (such as a wine thief), or for adding or removing product from the vessel interior. The ports may be capped when not in use.

Coupling elements, such as upper and lower embedded threaded receivers 54, 56, respectively, may be disposed on the upper and lower portions of the vessel right and left sides to serve as anchor points and coupling plate connection points. These enable the vessel to be secured to the floor with tie-down plates 58 and stacked upon one another with coupling plates 60.

Figure 3:
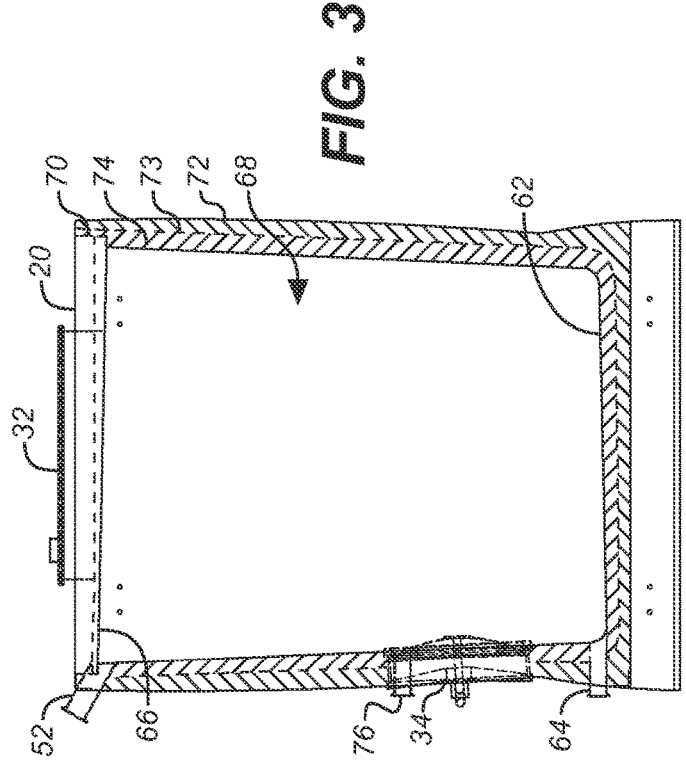
FIG. 3 is a right side in elevation thereof, showing interior features in phantom.
Figure 4:
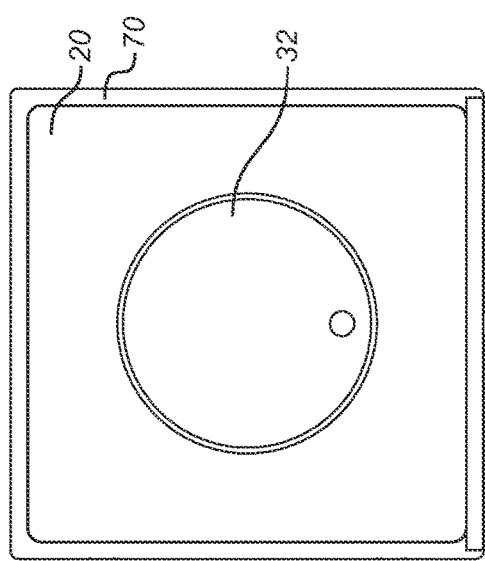
FIG. 4 is a top plan view thereof.
Figure 2:
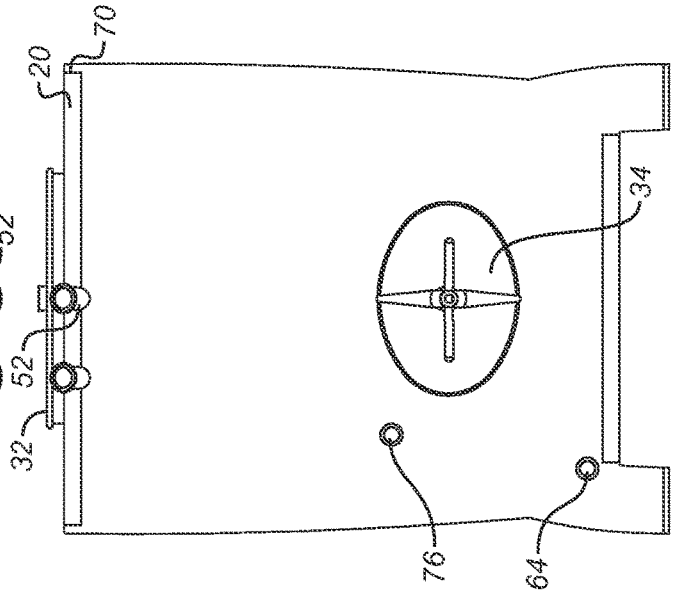
FIG. 2 is a front view in elevation of the vessel of FIG. 1A.
Figure 8:
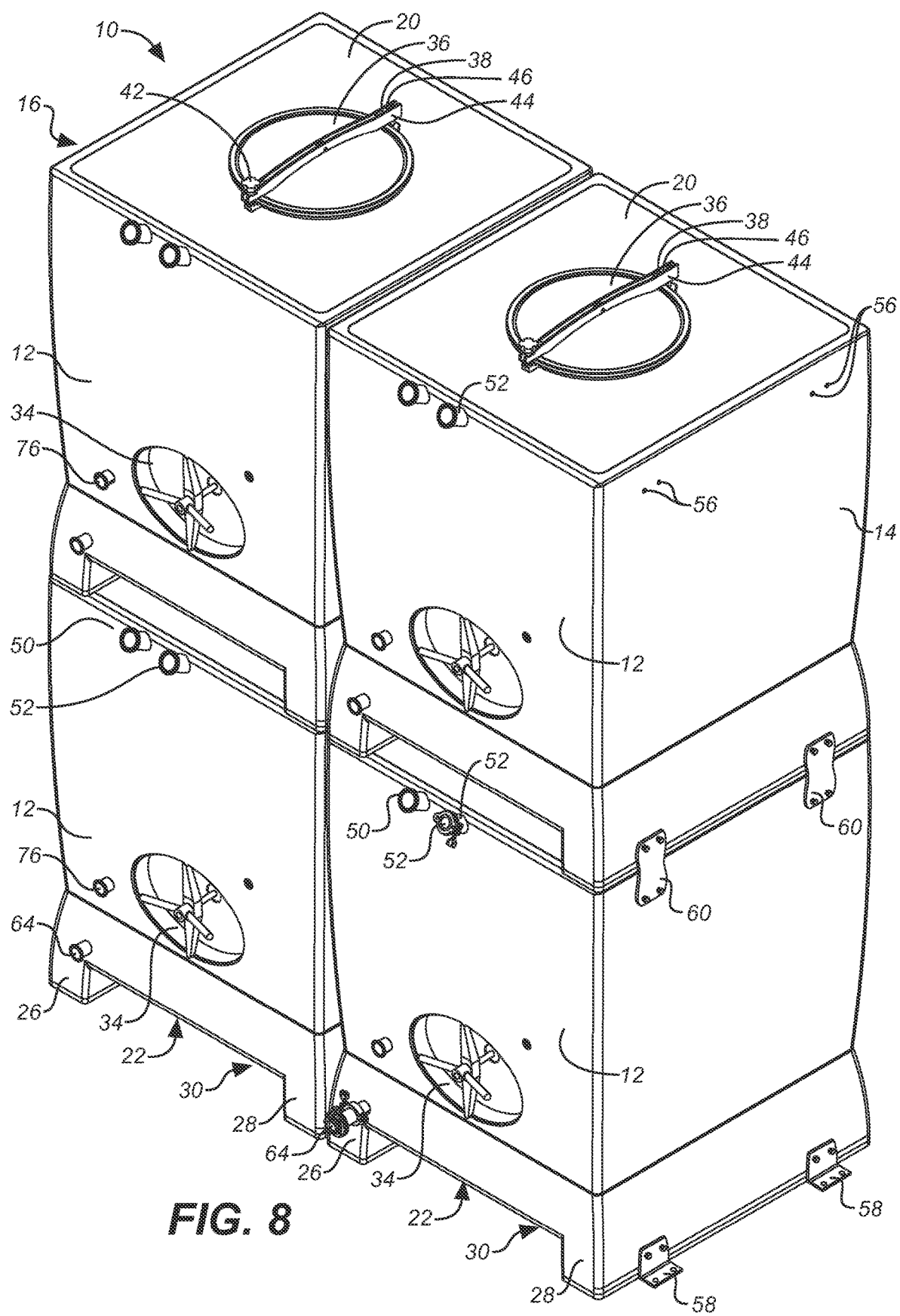
FIG. 8 is an upper left perspective view showing two sets of unit-on-unit stacked vessels.

Looking now at FIG. 3 in particular, it may be seen that the vessel floor 62 (i.e., the interior side of the tank bottom) is sloped gently toward the vessel front so that liquids will fully drain through a drain port 64 disposed at the base and front of the vessel when so desired. The ceiling 66 (i.e., the interior side of the top) of the vessel interior 68 slopes upwardly from the rear to the front, such that when filled with liquid to the ceiling, the access port is also filled to the edge of the vessel, thereby limiting oxygen exposure.

The top 20 of the vessel is bonded (e.g., with cement epoxy) to a perimeter ledge 70 formed in the contiguous front, right, rear, and left sides of the vessel.

The walls of the vessel structure (front, sides, rear, top, and bottom) are a binary composite envelope comprising, first, an exterior structural outer layer of high performance GFRC (glass fiber reinforced concrete), wherein the bottom and side walls form a continuous and contiguous exterior structural shell 72 of high flexural, tensile and compression strengths. The exterior protective layer or shell is preferably sprayed and consolidated in layers over the interior containment liner, next described.

The binary composite envelope next includes an interior containment liner 74 of wet cast concrete fabricated with one of the geopolymer concrete formulas set out below. The outer and inner layers are separated by a layer of fiberglass mesh 73 disposed between the exterior structural shell and the interior containment liner. Other types of material barriers may be employed to separate and segregate the structural portions of the shell.

When employed in wine production, the shell may include penetrations other than the above-identified access ports. For instance, an optional racking port 76 may be included.

Figure 9:
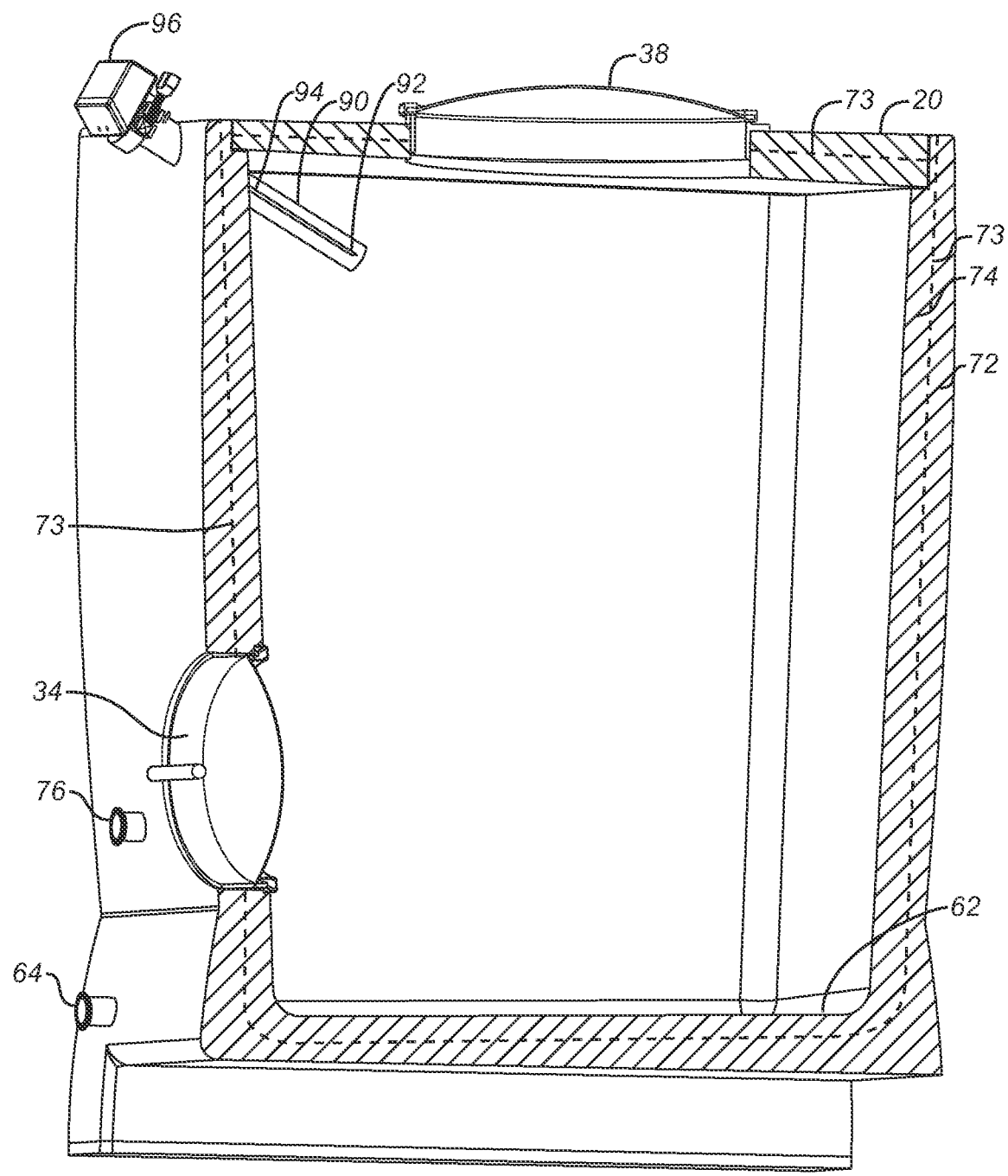
FIG. 9 is a front right cross-sectional view showing the interior features and sensor system of an embodiment of the vessel.

And referring now to FIGS. 7 and 9, in an embodiment a protective tube 90 (stainless steel mesh) may be placed in one of the access ports so as to extend down into the stored liquid. A level sensor strip 92 and a temperature probe 94 may disposed in the protective tube and coupled to a sensor transmitter 96 having an internal circuit board and wifi radio antenna so as to transmit data concerning product conditions to a receiving system (e.g., a server computer). The server includes software that provides a visual display 100 of the data by vessel location and presents alerts 102 when product conditions warrant attention (see FIG. 11).

In embodiments, the interior (inner containment) layer may have a composition as follows:

Geopolymer Blend #1: (a) 1 part dry earth components dried and milled from 200 mesh to 450 mesh minus and chosen from specific sources for low loss on ignition ("LOI") and low heavy metal content, in the following mineral descriptions in noted percentage ratios: (a1) 0-15% volcanic pumice; (a2) 0-15% diatomaceous earth/siliceous shale; (a3) 0-15% volcanic ash; (a4) 0-25% calcium carbonate; (a5); 0-50% silica; (a6) 0-50% kaolinite clay; (a7) 0-20% fired clay bisque; (a8) 0-35% soda lime glass; (a9) 0-20% calcium sulfate hemihydrate; (a10) 0-20% lime kiln dust; (b) (0.4-0.6 parts) alkaline reactive components, comprising specific base solutions selected from: (b1) 60-80% sodium silicate solution 40-60% solids, and (b2) 20-40% sodium and/or potassium hydroxide solution 40-60% solids; (c) (1-2 parts) silica sand; and (d) (0.2-0.3 parts) water.

In an alternative blend, referred to herein as geopolymer blend #2, the composition may include the following:

Geopolymer Blend #2: (a) 1 part dry earth components dried and milled from 200 mesh to 450 mesh minus and chosen from specific sources for their low LOI and 9 out of 14 of the following components chosen for their low heavy metal content; in the following mineral descriptions in noted percentage ratios: (a1) 0-10% volcanic pumice; (a2) 0-10% diatomaceous earth/siliceous shale; (a3) 0-10% volcanic ash; (a4) 0-25% calcium carbonate; (a5) 0-20% silica; (a6) 0-40% kaolinite clay; (a7) 0-10% fired clay bisque; (a8) 0-20% soda lime glass; (a9) 0-10% calcium sulfate hemihydrate; (a10) 0-20% lime kiln dust; (a11) 0-30% type F fly ash; (a12) 0-20% type C fly ash; (a13) 0-25% rice hull ash; (a14) 0-10% blast furnace slag; and (b) (0.4-0.6 parts) alkaline reactive components, comprising specific base solutions selected from: (b1) 60-80% sodium silicate solution 40-60% solids; (b2) 20-40% sodium and/or potassium hydroxide solution 40-60% solids; (c) (1-2 parts) silica sand; and (d) (0.2-0.3 parts) water.

The properties and performance characteristics of mortar cubes made from the foregoing two geopolymer blends (formulas #1 and #2) were compared to the properties and characteristics of mortar cubes made from two controls, including one made from a fly ash geopolymer and the other from standard Portland cement. The test and fly ash control cubes were cast in cubes measuring uniformly two inches on each side and were cured at 120 to 160 degrees F. for 24 hours. They were tested at 14 days. The standard Portland cement control cubes were identically sized cubes and cured using an ASTM industry standard 27-day cure and subjected to testing at 27 days. Test results are shown in the tables of FIGS. 12A-12D, 200, 210, 220, and 230, respectively.

The control cube compositions included the following:

Fly Ash Geopolymer Mortar Cube: (a) 1 part dry earth components comprising: (a) ASTM C618 compliant SCM's of the following industrial waste material descriptions in the ratios of 67% Class F fly ash and 33% Class C fly ash; (b) 0.4-0.6 parts alkaline reactive components, comprising specific base solutions selected from 60-80% sodium silicate 40-60% solids, and 20-40% sodium and/or potassium hydroxide 40-60% solids; (c) 1 to 2 parts silica sand; and (d) 0.1 to 3 parts water.

Standard Portland Cement Mortar Cube: (a) 1 part ASTM Type II-V cement; (b) 1 to 2 parts silica sand; and (c) 0.4 to 0.5 parts water.

Figure 10:
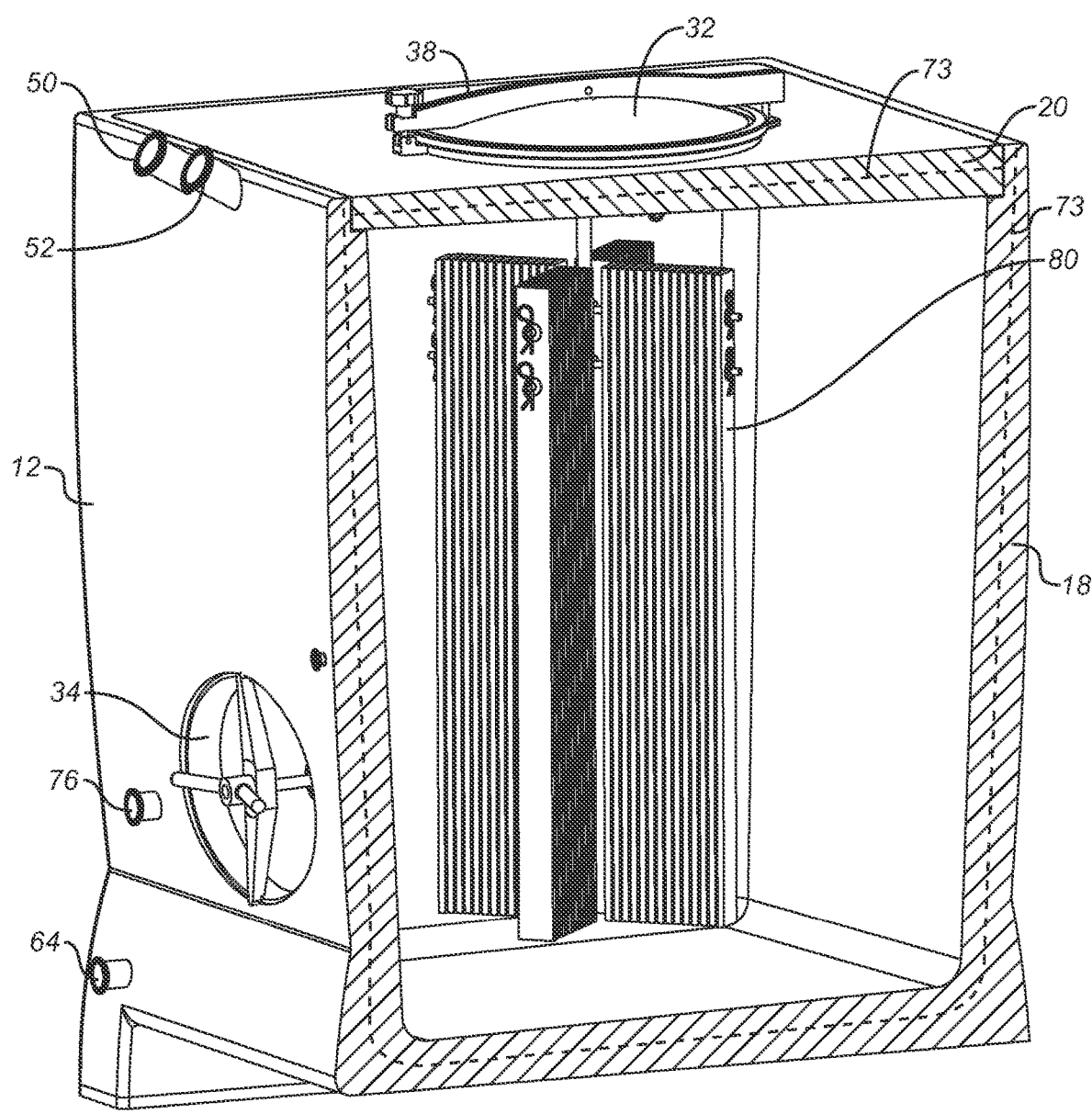
FIG. 10 is the same view showing oak staves suspended from the top manway.
Figure 11:
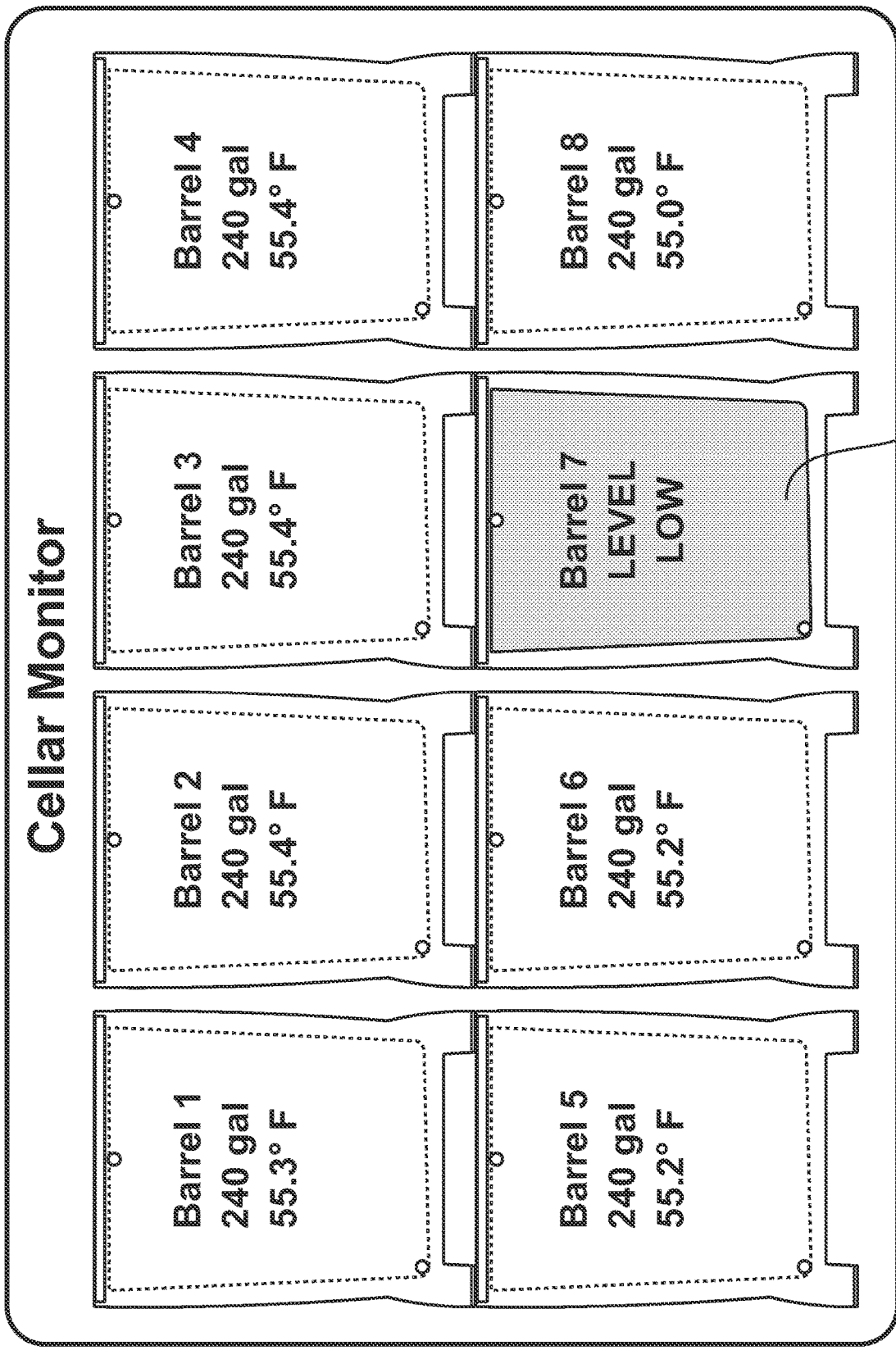
FIG. 11 is an embodiment of a visual map showing data gathered from system sensors disposed in the stacked vessels in a wine production cellar.

Looking next at the cross-sectional views in elevation of FIG. 5 and FIG. 10, when the vessel is used for storing wines, flavor imparting oak staves 80 (or other flavor imparting substances) may be immersed in the wine and left to steep for a period of time by suspending the staves on a hanger hooked to the top manway 32.

Accordingly, and as will be appreciated from the foregoing detailed description and the accompanying drawings, in its most essential aspect the present invention is a liquid storage vessel, especially well-adapted for use in wine storage, and includes a base with a bottom and an interior floor. A continuous side extends vertically from the base and has an interior surface. The bottom and the continuous side each include an internal layer and an external layer separated by a material barrier. The layers are configured such that the interior layers form a continuous inner containment liner, and the external layers form a continuous exterior structural shell enclosing the inner containment liner. A top is bonded to the continuous side and has an interior ceiling. One or more manways provide access to the tank interior. Mounting and connecting structures enable the tanks to be stacked directly atop one another and then structurally connected. A preferred material for the exterior structural shell is a high performance fiber reinforced concrete. The inner containment liner is fabricated from a geopolymer concrete blend.

The foregoing disclosure is sufficient to enable those with skill in the relevant art to practice the invention without undue experimentation. The disclosure further provides the best mode of practicing the invention now contemplated by the inventor.

What is claimed as invention is:

1. A stackable wine storage tank, comprising:
    an inner containment liner made from a cast concrete blend and forming an interior storage volume, wherein said cast concrete blend is a combination of milled dry earth components, alkaline reactive components, solutions of inorganic alkaline salts, silica sand, and water;
    an exterior structural shell enclosing said inner containment liner so as to form a two-layered vessel including a front side, right and left sides, a rear side, and a bottom side, said exterior shell made from a fiber reinforced concrete;
    a base integral with said bottom side;
    a top disposed on said vessel and having a sloped interior ceiling;
    a manway disposed on said top or on said front side;
    a drain port disposed on a front side proximate said bottom side of said vessel; and
    coupling structure for connecting stacked vessels.

2. The stackable wine storage tank of claim 1, wherein said dry earth components include volcanic pumice, diatomaceous earth/siliceous shale, volcanic ash, calcium carbonate, silica, kaolinite clay, fired clay bisque, soda lime glass, calcium sulfate hemihydrate, and lime kiln dust.

3. The stackable wine storage tanks of claim 2, wherein said dry earth components further include type F fly ash and type C fly ash, rice hull ash, and blast furnace slag.

4. The stackable wine storage tank of claim 1, further including legs disposed under said base so as to provide ground clearance and tank clearance between stacked tanks for forklift and stored product access, wherein said legs are reinforced and approximate the interface between said legs and floor or supporting a stackable wine storage tank below.

5. The stackable wine storage tank of claim 4, further including connection structure to couple stacked tanks to one another, said connection structure comprising upper and lower embedded threaded receivers disposed on upper and lower portions of said vessel sides with which to connect stacked vessels using coupling plates.

6. A stackable liquid containment vessel, comprising:
a base having a bottom with an interior floor;
a continuous side extending generally vertically from said base and having an interior surface;
said bottom and said continuous side each including an internal layer and an external layer configured in such a way that said interior layers form a continuous inner containment liner defining an interior liquid storage volume, and said external layers form a continuous exterior structural shell enclosing said inner containment liner;
a vessel top disposed atop said continuous side and having an interior ceiling;
at least one access manway located on said top or on said continuous side of said vessel; and
mounting structure on said base for placement on ground so as to create a ground clearance underneath said bottom; and
wherein said exterior structural shell is a high performance fiber reinforced concrete, and said inner containment liner is a cast concrete blend, wherein said cast concrete blend includes milled dry earth components having low loss on ignition, low organic and low heavy metal content.

7. The stackable liquid containment vessel of claim 6, wherein said dry earth components are milled to a range of approximately 200 mesh to approximately 450 mesh.

8. The stackable liquid containment vessel of claim 7, wherein said dry earth components of said cast concrete blend include volcanic pumice, diatomaceous earth/siliceous shale, volcanic ash, calcium carbonate, silica, kaolinite clay, ultra-fine fired clay bisque, soda lime glass, calcium sulfate hemihydrate, and lime kiln dust.

9. The stackable liquid containment vessel of claim 8, wherein said dry earth components further include type F fly ash, type C fly ash, rice hull ash, and blast furnace slag.

10. A stackable liquid containment vessel, comprising:
a base having a bottom with an interior floor;
a continuous side extending generally vertically from said base and having an interior surface;
said bottom and said continuous side each including an internal layer and an external layer configured in such a way that said interior layers form a continuous inner containment liner defining an interior liquid storage volume, and said external layers form a continuous exterior structural shell enclosing said inner containment liner;
a vessel top disposed atop said continuous side and having an interior ceiling;
at least one access manway located on said top or on said continuous side of said vessel; and
mounting structure on said base for placement on ground so as to create a ground clearance underneath said bottom; and
wherein said exterior structural shell is a high performance fiber reinforced concrete, and said inner containment liner is a cast concrete blend, further including upper and lower embedded threaded receivers disposed on upper and lower portions of said vessel sides to accept threaded fasteners and to serve as anchor points for connecting stacked vessels to one another with coupling plates and securing said vessel to the floor with tie-down plates.

* * * * *